US007004145B2

(12) United States Patent
Zander

(10) Patent No.: US 7,004,145 B2
(45) Date of Patent: Feb. 28, 2006

(54) FUEL DISTRIBUTION PIPE FOR MOTOR VEHICLE INJECTION DEVICES, IN PARTICULAR FOR COMMON RAIL SYSTEMS

(75) Inventor: Eckbert Uwe Zander, Downers Grove, IL (US)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/945,726

(22) Filed: Sep. 21, 2004

(65) Prior Publication Data

US 2005/0045152 A1 Mar. 3, 2005

Related U.S. Application Data

(63) Continuation of application No. PCT/DE03/01431, filed on May 5, 2003.

(30) Foreign Application Priority Data

May 7, 2002 (DE) ................................ 102 20 339

(51) Int. Cl.
*F02M 55/02* (2006.01)
*F16L 55/10* (2006.01)

(52) U.S. Cl. ......................... 123/456; 123/468; 138/89

(58) Field of Classification Search ................ 123/456, 123/468, 469; 138/89, 96 R, 96 T
See application file for complete search history.

(56) References Cited

U.S. PATENT DOCUMENTS

| | | | | |
|---|---|---|---|---|
| 3,598,434 | A * | 8/1971 | Patton et al. | 403/11 |
| 6,276,336 | B1 | 8/2001 | Krüger et al. | 123/456 |

FOREIGN PATENT DOCUMENTS

| | | | |
|---|---|---|---|
| DE | 197 44 762 | A1 | 10/1998 |
| DE | 197 21 175 | C2 | 12/2000 |
| DE | 101 43 511 | A1 | 3/2003 |
| EP | 0 866 221 | A1 | 12/1997 |
| EP | 1 298 314 | A1 | 9/2002 |

* cited by examiner

*Primary Examiner*—Thomas Moulis
(74) *Attorney, Agent, or Firm*—Baker Botts L.L.P.

(57) ABSTRACT

The interior of the drawn, rolled or forged pipe (1) forms a high-pressure reservoir (2) comprising pressure lines (4), which are respectively connected to the reservoir by means of a transversal bore (3). The sealing body (7) of an end connection presses against a bearing surface (8) of the pipe (1) to form a seal by means of a force transmission element (9, 10, 13) that is provided with a thread. To reduce axial installation space and to improve the tensioning conditions, the sealing body (7) and the force transmission element (10, 13, 18) are arranged at least partially parallel to one another in the axial direction.

16 Claims, 3 Drawing Sheets

FUEL DISTRIBUTION PIPE FOR MOTOR VEHICLE INJECTION DEVICES, IN PARTICULAR FOR COMMON RAIL SYSTEMS

CROSS REFERENCE TO RELATED APPLICATION

This application is a continuation of copending International Application No. PCT/DE03/01431 filed May 5, 2003 which designates the United States, and claims priority to German application no. 102 20 339.3 filed May 7, 2002.

TECHNICAL FIELD OF THE INVENTION

The invention relates to a fuel distribution pipe for motor vehicle injection devices, in particular for common rail systems, consisting of a drawn, rolled or forged pipe, the interior of which forms a high-pressure accumulator for accommodating fuel, to which are connected pressure lines each of which opens out into the interior of the pipe through a transverse bore, and which has at least on one face an end closure with a sealing body, whereby the sealing body is pressed onto an appropriate mating surface on the pipe by a threaded force-transmission element, to form a seal.

DESCRIPTION OF THE RELATED ART

A fuel distribution pipe of this type is already known from EP 0 866 221 A1. One face of the known distribution pipe—the other face is commonly used for the connection to a high-pressure pump—is closed off by a sealing body which, on the interior side, is domed or spherical in shape, and which is pressed against a mating surface on the fuel distribution pipe by a threaded plug arranged axially in line with it, to form a seal.

In vehicle engineering, increasing use is being made, particularly for diesel motors, of injection systems in which statically compressed fuel is provided at operating pressures of far above 1,000 bar in the system of feed lines. Because of the high pressures, the requirements to be met in terms of the material strength and seal tightness of the system of feed lines are very high, particularly for the fuel distributor (rail) which acts as a high-pressure store.

In order to fulfill these requirements, the fuel distribution pipe is conventionally manufactured from a forged piece, on which are formed the connector joints for attaching pressure lines. The distribution paths are provided by bored holes, i.e. a lengthwise bore is produced, into which open transverse bores which pass through the connector joints. With a drawn or rolled fuel distribution pipe, the interior (the lengthwise bore) is significantly easier to make. In addition, compared to a forged and bored-out fuel distributor the pipe has greater strength in spite of having smaller wall thicknesses.

In the fuel distribution pipe, the highest mechanical stresses occur at the intersections of the bores, between the lengthwise bore and the transverse bore. These high stresses are normally accounted for by the vector superimposition of the peripheral stresses arising from the internal pressure loads. In this context, it is known from EP 0 866 221 A1 cited above how to increase the strength of the pipe by processing of the internal surface. This reduces the loss of fatigue strength which results from the mechanical processing (formation of the plug-in or transverse bores), and achieves a rounding of the edges in the transition area between the plug-in or transverse bores and the internal wall, which at the same time results in a lessening of the reduction in fatigue strength—which occurs at the intersections of the bores when subject to internal pressure.

SUMMARY OF THE INVENTION

The object of the present invention is to develop the fuel distribution pipe mentioned above in such a way as to enable the stress characteristics at the edges of the intersections to be optimized. In particular, it should also be possible to reduce the problematic stresses at the edges of the intersections, which go with the overall design relationships, even when the installation space is fixed.

This object is achieved by a fuel distribution pipe of the type mentioned above in that the sealing body and the force-transmission element are arranged so that they are at least partly parallel to each other in the axial direction.

A fuel distribution pipe for vehicle injection devices, in particular for common rail systems may comprise a drawn, rolled or forged pipe, the interior of which forms a high pressure accumulator for accommodating fuel, pressure lines connected to the pipe each of which opens into the interior of the pipe through a transverse bore, an end closure on at least one face with a sealing body, whereby a threaded force transmission element presses the sealing body against an appropriately designed mating surface on the pipe to form a seal, wherein the sealing body and the force transmission element are arranged to be at least partially parallel to each other in an axial direction, and wherein the force transmission element takes the form of a threaded stopper with a recess on the sealing body side, and is screwed into an internal thread in the pipe, and the sealing body is accommodated for part of its axial length in the recess.

The sealed height of the sealing body can be uniformly surrounded by the threaded stopper. The sealing body may take the form of a sphere or has a face which on the interior side is domed or spherical in shape. The force transmission element may consist of cold-forged steel.

The invention is based on the initial consideration that there may be other stresses superimposed on the mechanical stresses resulting from the internal pressure. There are, on the one hand, stresses which result from the sealing force at the connector joints of a pressure line, and on the other hand stresses which come from the sealing force on the end closure. Further consideration indicates that the magnitudes of the stresses emanating from a connector joint are small, and can be kept low by a sufficiently large distance between its contact surface and the intersection edge. With the usual wall thicknesses of fuel distribution pipes, this element of the stress is currently not limiting. However, it emerges that the contribution to the stress due to the end closure is significant. In principle it could be reduced by a reduction in the sealing force, but on safety grounds this is not possible in practice. An increase in the distance between the sealing surface and the closest intersection edge thus appears to offer a better alternative. However, if the position of the connection for the pressure line is prescribed, this would inevitably lead to a lengthening of the fuel distribution pipe.

In accordance with the invention, the sealing body and the force transmission element are thus not arranged axially in line, but are at least partly parallel, in order to save axial space. With a fixed installation space it is then possible to increase the distance between the mating surface of the sealing body and the edge of intersection of the neighboring transverse bore, and thereby to reduce the stresses caused by the end closure at the critical place in the pipe—the closest intersection edge. On the other hand, taking into account the previous stresses, the possibility indeed arises of reducing the overall axial length of the fuel distribution pipe.

A preferred form of embodiment, simple to manufacture and assemble, can be achieved by making the force transmission element in the form of a threaded cap, screwed onto an external thread on the pipe or into an internal thread in the pipe, with the base of the threaded cap pressing against the side of the sealing body which is sealed off by the mating surface.

BRIEF DESCRIPTION OF THE DRAWINGS

In the following exemplary embodiments, the fuel distribution pipe is explained in more detail by reference to the Figures in the drawing. These show FIG. 1 a sectional side view of a fuel distribution pipe in accordance with the state of the art, FIG. 2 the same view of a fuel distribution pipe in accordance with the invention, FIGS. 3A and 3B the same view of other exemplary embodiments of the invention.

DETAILED DESCRIPTION OF THE PREFERRED EMBODIMENT

Figure 1:
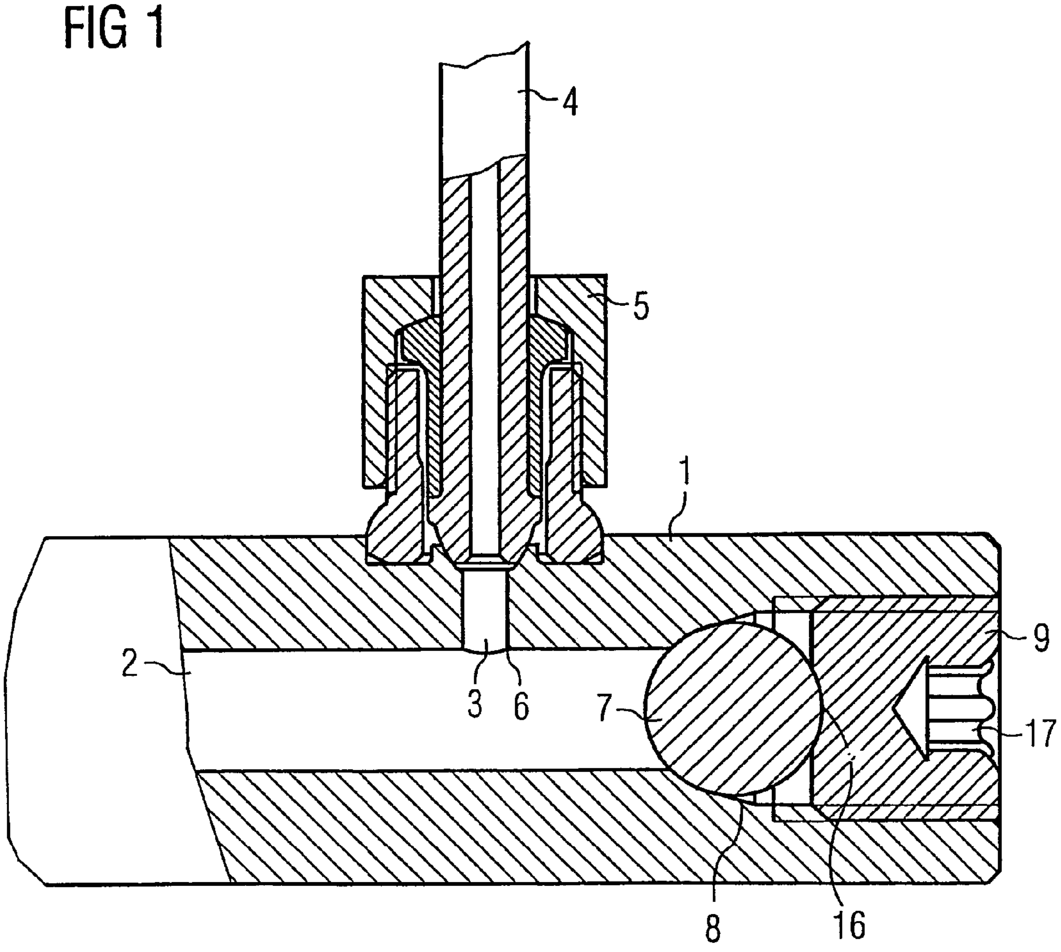

FIG. 1 shows a section of a known fuel distribution pipe which corresponds essentially with the embodiment according to Figure 10 of EP 0 866 221 A1 cited above. The fuel distributor consists of a drawn or rolled pipe 1. The interior ("lengthwise bore") of the pipe 1 forms a high-pressure accumulator 2 into which open transverse bores 3, each of which is connected to a pressure line 4. Each of the pressure lines 4 is connected to the pipe 1 by a connection joint 5. The diameter of the transverse bore 3 corresponds roughly to the clear diameter of the pressure line 4, so that for practical purposes the latter opens out into the high-pressure accumulator 2. Each pressure line 4 thus has an associated transverse bore 3 which runs radially in the pipe 1. Where the lengthwise bore and the transverse bore 3 intersect, an edge of intersection 6 is formed.

The right-hand end face of the pipe 1, which can be seen in FIG. 1, has an end closure. This consists essentially of a spherical sealing body 7, which presses directly against an appropriately designed mating surface 8 in the inside of the pipe 1 to form a seal. The requirement is to hold the sealing body 7 against the mating surface 8 by means of a threaded pin 9 so that, even considering the high pressure present in the high-pressure accumulator 2, a sealed closure 16 of it is guaranteed. A sealed closure 16 can, as indicated in FIG. 1, be assisted by modifying the sealing body 7 and threaded pin 9 slightly, as a form of tolerance allowance. The threaded pin 9 can be screwed in with the help of a recess 17 for insertion of a screwing tool.

FIG. 1 shows the connection joint 5 which lies nearest to the mating surface 8, and with it also the edge of intersection 6. Because the threaded pin 9 and the sealing body 7 are arranged axially one behind the other, the mating surface 8 is located relatively far inside the pipe, and hence also relatively near to the edge of intersection 6 which is therefore exposed to a high degree to the effects of the sealing force which originate from the mating surface 8, and which are unfavorable for it.

Figure 2:
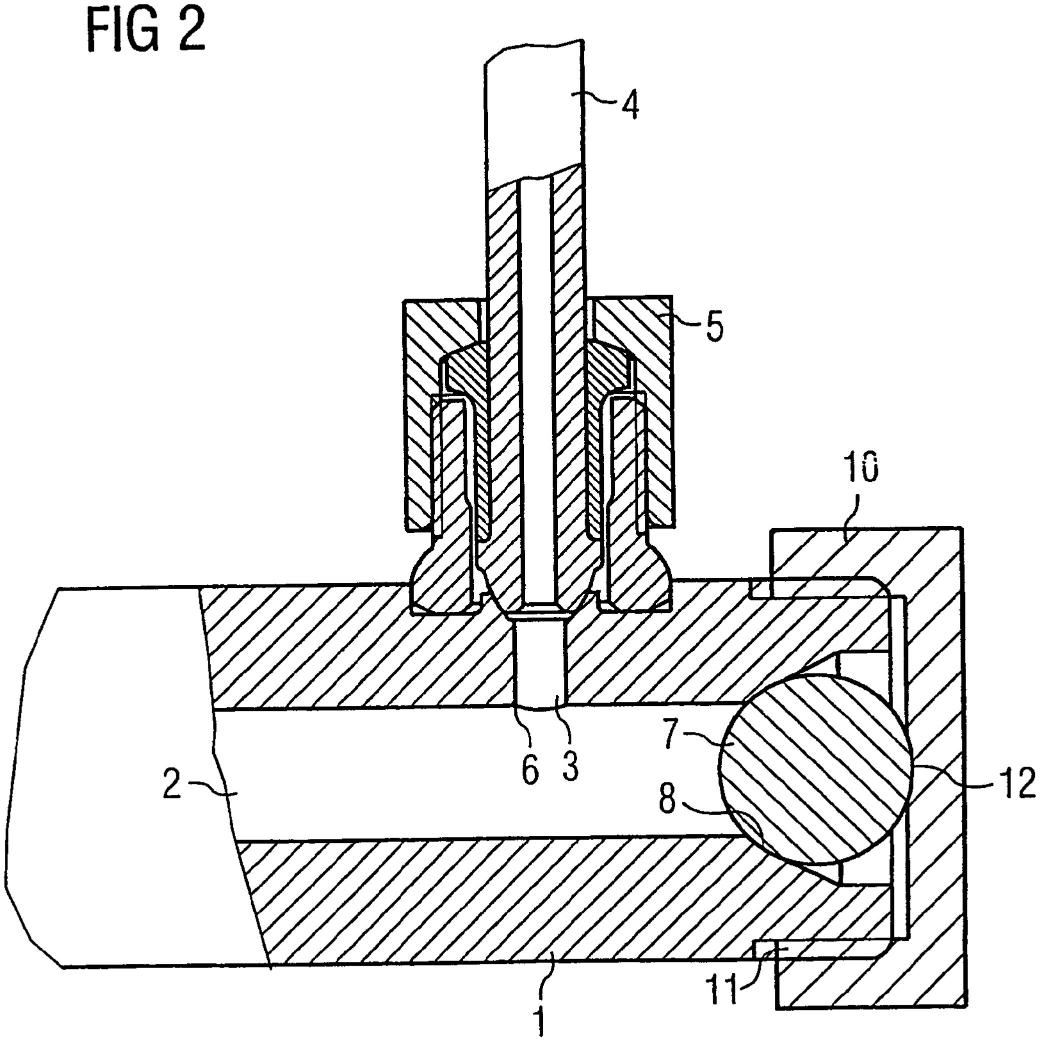

FIG. 2 shows a fuel distribution pipe in accordance with the invention, on which the end closure of the pipe 1 is ensured by a sealing body 7 which is held in position by a threaded cap 10. The threaded cap (10) has on its skirt, or more precisely on the inner side of its cylindrical section, an internal thread, while the pipe 1 has a corresponding external thread 11. The sealing body 7 lies directly against the base 12 of the threaded cap 10, with a tolerance allowance if applicable. The skirt of the threaded cap 10 extends around the outside of the pipe 1, as can be seen, over a significant part of the axial dimension of the sealing body 7. The material and thickness of the base 12 of the cap can be chosen according to the specific conditions.

The partly parallel arrangement of the sealing body 7 and the force transmission element 10 in FIG. 2 permits savings to be made on the axial installation space. The dimensional difference between the thickness of the cap base 12 and the length of the threaded pin 9, previously used in accordance with FIG. 1, corresponds to a saving on the overall axial length, or a potential for increasing the distance between the mating surface 8 and the edge of intersection 6. According to the invention it is therefore possible on the one hand to reduce the stress at the edge of intersection 6 for a given overall axial length; or on the other hand, for given stresses an absolute reduction can be made in the overall axial length of the fuel distribution pipe. These two advantages can, to greater or less relative extents, also be combined.

In a variation, the cap base 12 can be made in one piece with the side of the sealing body 7 which is sealed off by the mating surface 8. In general, the sealing body 7 need not necessarily be made as shown in the figures, as a sealing sphere which can be made at low cost, but could also for example have a first face towards the interior which is domed or spherical in shape and a second face on the side of the force transmission element 10 which is flat. This may permit further axial space to be saved. In general it is also advantageously possible to make use of a cold-forged force transmission element which can be cheaply manufactured.

Figure 3A:
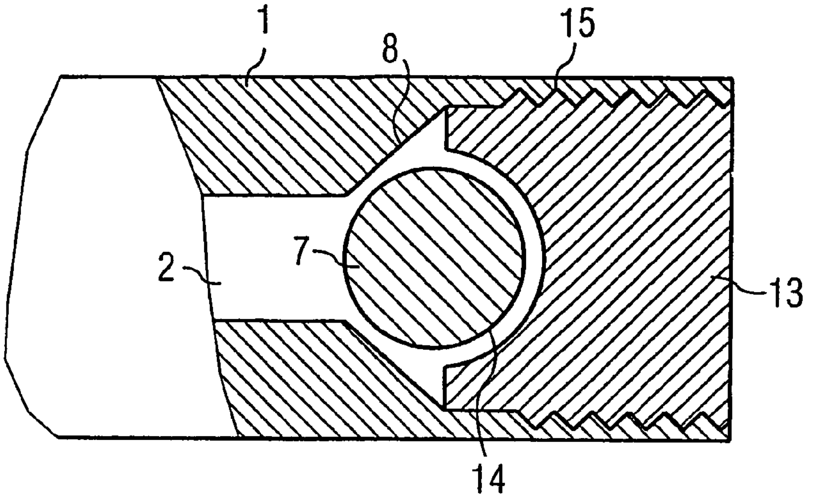

In other respects, the invention is not restricted to the combination of threads shown in FIG. 2: externally threaded pipe/internally threaded force transmission element. For example, the force transmission element can, as shown in FIG. 3A, take the form of a threaded stopper 13 with a recess 14 on the sealing body side, screwed into an internal thread 15 in the pipe. Here, to save space part of the axial length of the sealing body 7 is accommodated in the recess 14 so that in this case the sealed height is uniformly surrounded by the threaded stopper 13. An arrangement such as that in FIG. 3B, in which the threaded cap 18 is screwed into an internal thread in the pipe, differs from the arrangement as in FIG. 3A primarily in geometrical respects (larger radius).

Figure 3B:
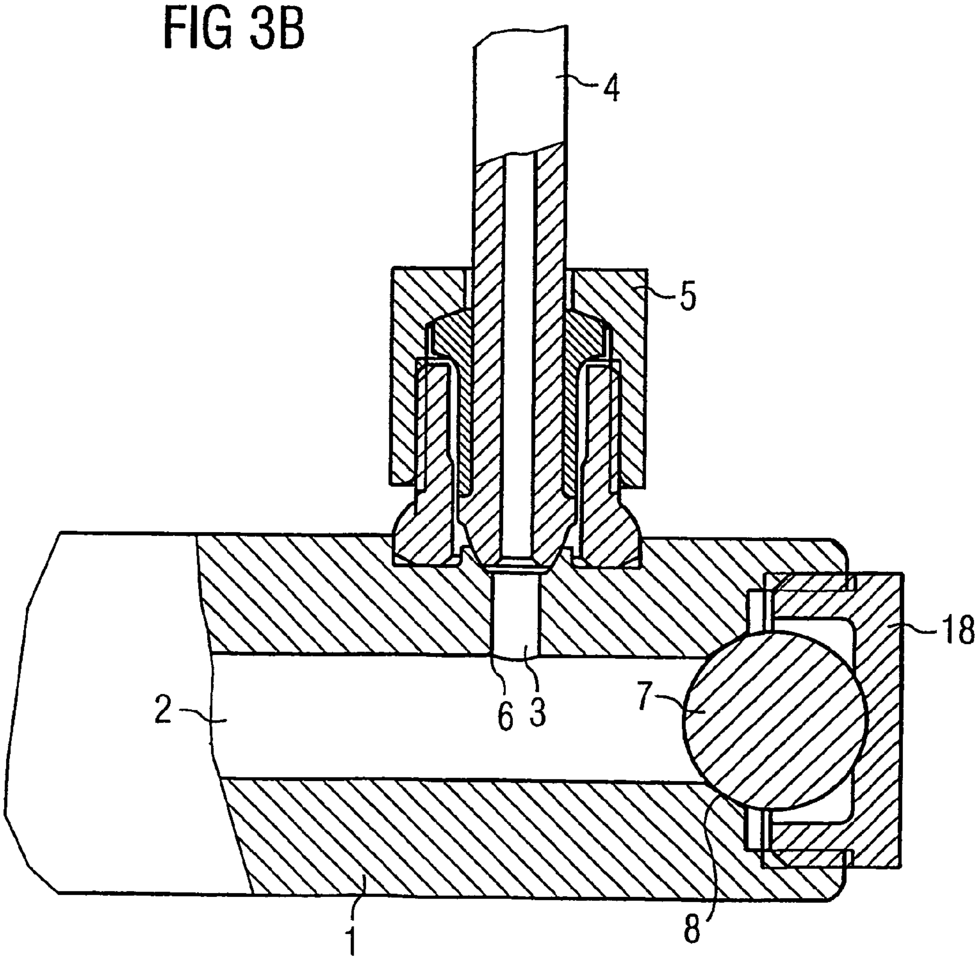

FIGS. 2, 3A and 3B do not show the openings or surfaces required for applying a force when the force transmission elements 10, 13 and 18 are being screwed in. For example, external spanner flats can be provided on the skirt of the threaded cap 10, 18, or an opening on the rear similar to that in FIG. 1, for inserting a key.

I claim:

1. A fuel distribution pipe for common rail fuel injection systems comprising:

a drawn, rolled or forged pipe, the interior forming a high pressure accumulator for accommodating fuel, pressure lines connected to the pipe, each line opening into the interior of the pipe through a transverse bore, an end closure coupled to a face of the pipe with a sealing body, whereby a threaded force transmission element presses the sealing body against an appropriately designed mating surface on the pipe to form a seal, wherein the sealing body and the force transmission element at least partially parallel to each other in an axial direction, the force transmission element comprising a threaded stopper with a recess on the sealing body side, said element screwed onto into an external thread on the pipe, and the sealing body is accommodated for part of its axial length in the recess, and the sealed height of the sealing body is uniformly surrounded by the threaded stopper.

2. The fuel distribution pipe in accordance with claim 1, wherein the sealing body has a generally spherical shape.

3. The fuel distribution pipe in accordance with claim 1, wherein the force transmission element consists of cold-forged steel.

4. The fuel distribution pipe in accordance with claim 2, wherein the force transmission element consists of cold-forged steel.

5. A fuel distribution pipe for common rail fuel injection systems comprising:

a drawn, rolled or forged pipe, the interior forming a high pressure accumulator for accommodating fuel, pressure lines connected to the pipe, each line of opening into the interior of the pipe through a transverse bore, an end closure coupled to a face of the pipe with a sealing body, whereby a threaded force transmission element presses the sealing body against an appropriately designed mating surface on the pipe to form a seal, wherein the sealing body and the force transmission element are at least partially parallel to each other in an axial direction, and the force transmission element comprises a threaded stopper with a recess on the sealing body side, said element screwed into an internal thread in the pipe, and the sealing body is accommodated for part of its axial length in the recess.

6. The fuel distribution pipe in accordance with claim 5, wherein the sealed height of the sealing body is uniformly surrounded by the threaded stopper.

7. The fuel distribution pipe in accordance with claim 5, wherein the sealing body has a face which on the interior side is domed.

8. The fuel distribution pipe in accordance with claim 6, wherein the sealing body or has a face which on the interior side is domed.

9. The fuel distribution pipe in accordance with claim 5, wherein the force transmission element consists of cold-forged steel.

10. The fuel distribution pipe in accordance with claim 6, wherein the force transmission element consists of cold-forged steel.

11. The fuel distribution pipe in accordance with claim 7, wherein the force transmission element consists of cold-forged steel.

12. The fuel distribution pipe in accordance with claim 8, wherein the force transmission element consists of cold-forged steel.

13. A common rail fuel distribution pipe for vehicle injection devices comprising:

a drawn, rolled or forged pipe, the interior forming a high pressure accumulator for accommodating fuel, pressure lines connected to the pipe, each line opening into the interior of the pipe through a transverse bore, a threaded stopper with a domed recess on the sealing body side, said stopper having external threads and screwed into an internal thread in the pipe, an end closure coupled to a face of the pipe with a sealing body, whereby the threaded stopper presses the sealing body against an appropriately designed mating surface on the pipe to form a seal, wherein the sealing body and the force transmission element are at least partially parallel to each other in an axial direction, and the sealing body is accommodated for part of its axial length in the recess, and the sealed height of the sealing body is uniformly surrounded by the threaded stopper.

14. The fuel distribution pipe in accordance with claim 13, wherein the sealing body has a face which on the interior side has a domed shape.

15. The fuel distribution pipe in accordance with claim 13, wherein the force transmission element consists of cold-forged steel.

16. The fuel distribution pipe in accordance with claim 14, wherein the force transmission element consists of cold-forged steel.

* * * * *